UNITED STATES PATENT OFFICE.

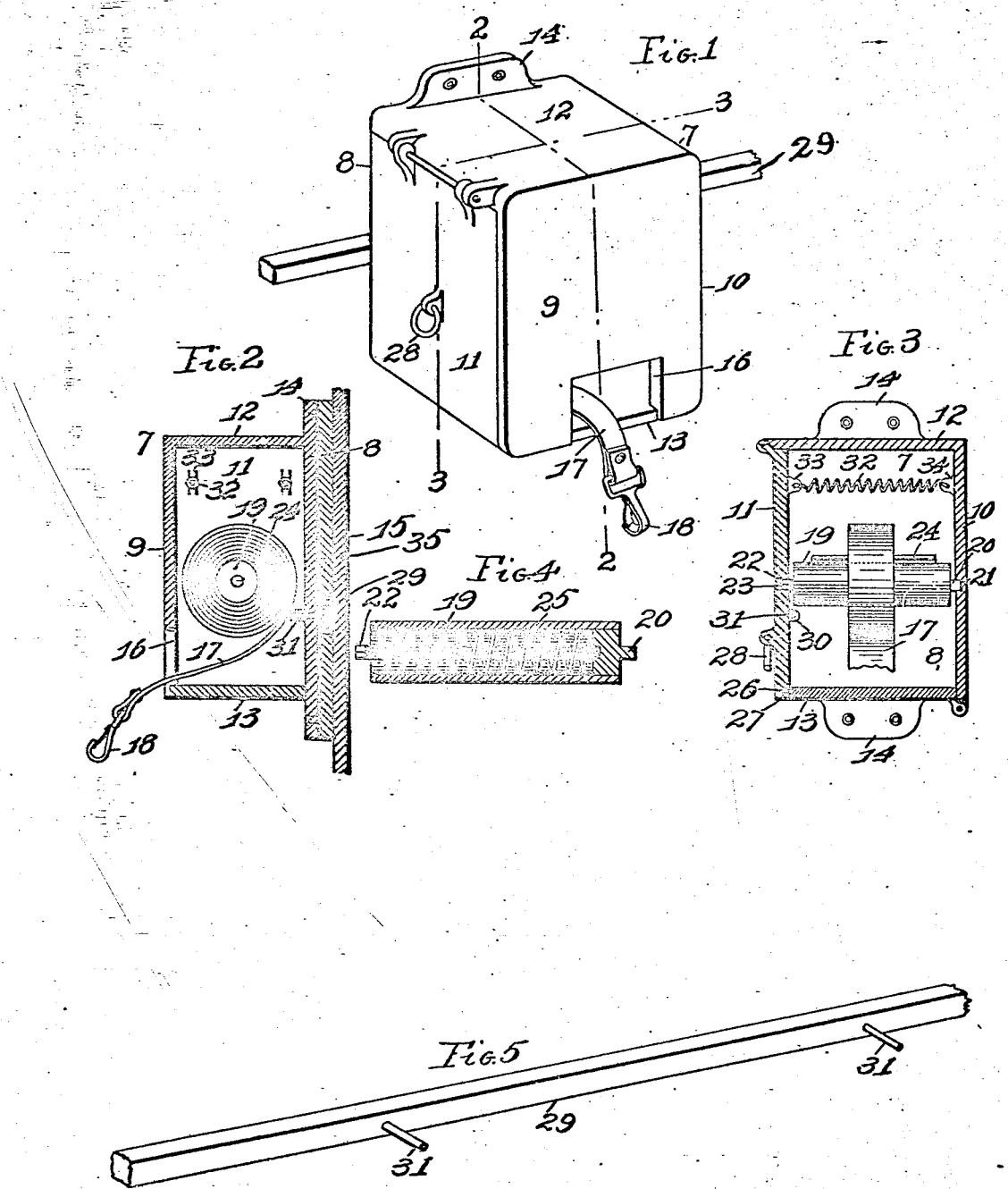

GEORGE SCHREPFER, OF ST. LOUIS, MISSOURI.

COMBINED HITCHING AND RELEASING MECHANISM FOR ANIMALS.

No. 895,309.          Specification of Letters Patent.          Patented Aug. 4, 1908.

Application filed June 7, 1906. Serial No. 320,635.

*To all whom it may concern:*

Be it known that I, GEORGE SCHREPFER, a citizen of the United States, and resident of St. Louis, Missouri, have invented certain new and useful Improvements in a Combined Hitching and Releasing Mechanism for Animals, of which the following is a specification.

This invention relates to improvements in a combined hitching and releasing mechanism for animals, and consists in the novel arrangement, construction and combination of parts as will be fully hereinafter described and claimed.

The object of my invention is to construct a device to be placed in each stall of the barn to which the animal is fastened, and a means whereby the entire series of devices may be operated simultaneously and independently for releasing the animals.

A further object of my invention is that the strap to which the animal is fastened is retained in a taut position, yet adjusting itself to the movement of the animal.

In the drawings—Figure 1 is a perspective view of my invention. Fig. 2 is a central sectional view taken on the line 2—2 of Fig. 1. Fig. 3 is a cross-sectional view taken on the line 3—3 of Fig. 1. Fig. 4 is a detail sectional view of a spring-actuated roller made use of in connection with my invention. Fig. 5 is a detail perspective view of the releasing rod made use of in releasing the series of devices.

Referring to the drawings in detail, 7 indicates a housing composed of a rear wall 8, front wall 9, side walls 10 and 11, a top 12, and a bottom 13.

The upper and lower ends of the rear wall 8 are provided with integral perforated projections 14 by which the device is securely fastened to the front 15 of the stall. The front 9 is provided with an opening 16 through which operates the halter strap 17, the free end of which being provided with an ordinary snap 18, and its other end securely attached to the spring roller 19. The spring roller 19 is of the ordinary Hartshorn roller type, its pivotal end 20 being mounted and located in a recess 21 formed in the side wall 10, the other end 22 being formed square, and is held in a square recess 23 formed in the side wall 11. The halter strap is also provided with a stop bar 24, which comes in contact with the inner surface of the front wall 9 when the halter strap is withdrawn to prevent strain from being brought against the fastened end of the strap and disconnecting the same. The act of withdrawing the strap 17, winds up the spring 25, which upon being thus tightened has a tendency to wind up the strap upon the roller when the pull upon the strap is released.

The side wall 11 is hingedly connected at its upper end to the top 12, and its lower inner surface is provided with an elongated slot 26 into which is inserted a projection 27 formed on the bottom 13, retaining the same in closed position. The bottom 13 is hingedly secured to the lower end of the side 10 and is adapted to open itself by gravity when the side wall 11 is pulled outwardly by means of the ring 28, or releasing bar 29.

In the back 8 I provide a slot 30 through which is inserted the pin 31 formed on the releasing bar 29, and comes in direct contact with the inner surface of the side 11, and by pulling upon the releasing rod 29, will pull the side outwardly and release the bottom which will open automatically by gravity, at the same time release the roller 19, together with the halter strap and permit the same to fall upon the ground or floor, thereby automatically releasing the animal. The side 11 is held in closed position by means of the springs 32 which are connected to lugs 33 formed on the inner surface thereof, and the opposite end of said springs are held in lugs 34 formed on the inner surface of the side 10.

In placing my device in position upon the front wall of the stalls, I provide a strip of material 35 between the device and the wall 15, forming a space for the insertion of the shifting bar 29. (See Fig. 2.) This bar extends from stall to stall and may be operated from either end, and by operating this shifting bar, each and every device is placed in operation simultaneously, and the halter straps released. This operation would be necessary in the event of fire, where it is desired to release the animals rapidly. When it is desired to release one animal, the hostler may detach the halter strap 28 without interfering with the balance of the devices.

The form of housing which I have shown and described may be varied without departing from my invention, provided only that the roller 19 or other fastening device for a halter is adapted to be released by separating the members of the separable housing in which it is contained.

Having fully described my invention, what I claim, is:

1. In a hitching and releasing mechanism for animals, the combination of a housing having its bottom and one side hingedly mounted, a spring roller located in said housing between the hinged side and the opposite side, and a releasing bar provided with means whereby the roller may be released by the outward movement of the hinged side of the housing, substantially as described.

2. A device of the class described comprising a housing having a hinged side and a hinged bottom, a spring roller normally held in position between the hinged side and opposite side of the housing, a halter strap carried by said roller, and a mechanism for actuating the hinged side of the housing to release the roller and halter strap, substantially as described.

3. A device of the class described comprising a housing having a hinged bottom and a hinged side, a detachable connection between the free ends of the said hinged side and hinged bottom, a spring-actuated roller mounted within said housing between the hinged side and the opposite side thereof, a stop-bar for limiting the withdrawal of the strap from the housing, a releasing rod communicating with the hinged side whereby the side and bottom may be disengaged and the halter strap released from the housing, substantially as described.

4. A device of the class described comprising a housing having a hinged wall and a hinged bottom, a spring-controlled roller located within the housing, its one end having bearing in the hinged wall, a halter strap connected to the roller, a stop fastened to the halter strap to limit the withdrawal of said strap from the housing, a releasing rod communicating with the hinged wall whereby said wall may be operated on its hinge releasing the bottom and the spring roller, together with the halter strap, substantially as specified.

5. In a releasing device for stalls, a housing composed of a rear wall, front wall, side walls, one movable, the other fixed, a top, a bottom, a roller mounted within the housing, a member slidably mounted between the rear wall of the housing and the stall and provided with means adapted to contact with the movable side whereby the members composing the housing are separated to release the roller therefrom; means for retaining the movable side in contact with the bottom when in a normal position, substantially as described.

6. In a releasing device for stalls, a housing composed of a rear wall, front wall, side walls, one movable, the other fixed, a top, a bottom, a halter-fastening device mounted within the housing, a member slidably mounted between the rear wall of the housing and the stall and provided with means adapted to contact with the movable side whereby the members composing the housing are separated to release the fastening device therefrom, means for retaining the movable side in contact with the bottom when in a normal position, substantially as described.

In testimony whereof, I have signed my name to this specification, in presence of two subscribing witnesses.

GEORGE SCHREPFER.

Witnesses:
ALFRED A. EICKS,
WALTER C. STEIN.